(12) United States Patent
Hurley et al.

(10) Patent No.: US 9,292,338 B2
(45) Date of Patent: Mar. 22, 2016

(54) SCHEDULING EVENT STREAMS DEPENDING ON CONTENT INFORMATION DATA

(71) Applicant: INTERNATIONAL BUSINESS MACHINES CORPORATION, Armonk, NY (US)

(72) Inventors: Paul T. Hurley, Zurich (CH); John G. Rooney, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 14/097,546

(22) Filed: Dec. 5, 2013

(65) Prior Publication Data
US 2014/0165068 A1    Jun. 12, 2014

Related U.S. Application Data

(63) Continuation of application No. 12/876,275, filed on Sep. 7, 2010, now Pat. No. 8,612,983.

(30) Foreign Application Priority Data

Sep. 7, 2009 (EP) ..................................... 09169617

(51) Int. Cl.
*G06F 9/46* (2006.01)
*G06F 9/48* (2006.01)
*G06F 9/50* (2006.01)
*G06F 9/54* (2006.01)

(52) U.S. Cl.
CPC ............ *G06F 9/4806* (2013.01); *G06F 9/5055* (2013.01); *G06F 9/546* (2013.01); *G06F 2209/5018* (2013.01); *G06F 2209/5021* (2013.01)

(58) Field of Classification Search
None
See application file for complete search history.

(56) References Cited

U.S. PATENT DOCUMENTS

| 7,573,818 | B2 * | 8/2009 | Vaananen et al. | ............. 370/235 |
| 2003/0233464 | A1 * | 12/2003 | Walpole et al. | ............... 709/231 |
| 2008/0134043 | A1 | 6/2008 | Georgis et al. | |

OTHER PUBLICATIONS

Chakrabarti et al. ("A Near-Optimal Algorithm for Computing the Entropy of a Stream" SODA '07 Proceedings of the eighteenth annual ACM-SIAM symposium on Discrete algorithms, pp. 328-355).*
Chakrabarti et al., "A Near-Optimal Algorithm for Computing the Entropy of a Stream", SODA '07 Proceedings of the eighteenth annual ACM-SIAM symposium on Discrete algorithms, Oct. 24-26, 2007, pp. 328-355.

* cited by examiner

*Primary Examiner* — Wissam Rashid
(74) *Attorney, Agent, or Firm* — Scully, Scott, Murphy & Presser, P.C.; Jennifer Davis, Esq.

(57) ABSTRACT

Apparatus and method for scheduling event streams. The apparatus includes (i) an interface for receiving event streams which are placed in queues and (ii) a scheduler which selects at least one event stream for dispatch depending on sketched content information data of the received event streams. The scheduler includes a sketching engine for sketching the received event streams to determine content information data and a selection engine for selecting at least one received event stream for dispatch depending on the determined content information data of the received event streams. The method includes the steps of (i) determining content information data about the content of event streams and (ii) selecting at least one event stream from the event streams for dispatch depending on the content information data. A computer program, when run by a computer, causes the computer to perform the steps of the above method.

21 Claims, 3 Drawing Sheets

SCHEDULING EVENT STREAMS DEPENDING ON CONTENT INFORMATION DATA

CROSS REFERENCE TO RELATED APPLICATION

This application claims priority under 35 U.S.C. 119 from European Patent Application 09169617.9 filed Sep. 7, 2009, the entire contents of which are incorporated herein by reference. This application is a continuation of U.S. patent application Ser. No. 12/876,275 filed Sep. 7, 2010 the entire content and disclosure of which is incorporated herein by reference.

BACKGROUND

1. Field of the Invention

The present invention relates to scheduling event streams. More particularly, it relates to a method, to apparatus and to a computer program for scheduling event streams.

2. Description of Related Art

There are different types of event streams, such as sensor data, received from sensors as data sources. Examples are stock data and data from a currency arbitrage system. The event streams could include data which indicates a series of events such as parameter data or stock values.

An event stream can have different data formats and can be transmitted in data packets or continuously in frames. Such event stream data can, for example, indicate the temperature or a pressure measured by means of sensors. This event stream data can be processed by processing units, such as a CPU.

In most systems, it is not possible to process and evaluate all received event streams immediately because of the restricted resources of the processing unit. Accordingly, it is necessary to determine at any given moment which event stream to schedule next to be processed. This scheduling of received event streams is performed by a scheduler.

Conventional schedulers use different policies to schedule received event streams. These policies may include a round-robin policy, a priority-based scheduling or the allocation of a share of the available processing time to distinct event types.

SUMMARY

In accordance with one aspect of the present invention, apparatus for scheduling event streams includes (i) an interface for receiving event streams and placing such event streams in corresponding event stream queues and (ii) scheduling logic for selecting at least one event stream from the received event streams for dispatch depending on sketched content information data of said received event streams.

In accordance with another aspect of the present invention, a server for a network includes a scheduler for scheduling event streams received via an interface from a network. The scheduler includes (i) a sketching engine for sketching the received event streams to determine content information data about the content of said received event streams and (ii) a selection engine for selecting at least one received event stream from the received event streams for dispatch depending on the determined content information data of the received event streams.

In accordance with still another aspect of the present invention, a method for scheduling event streams includes the computer-implemented steps of (i) determining content information data about the content of event streams and (ii) selecting at least one event stream from the event streams for dispatch depending on the determined content information data of the event streams.

Yet another aspect of the present invention is a storage medium with a program stored on it. The program, when run by a computer, causes the computer to perform the steps of the above method.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION

Figure 1:
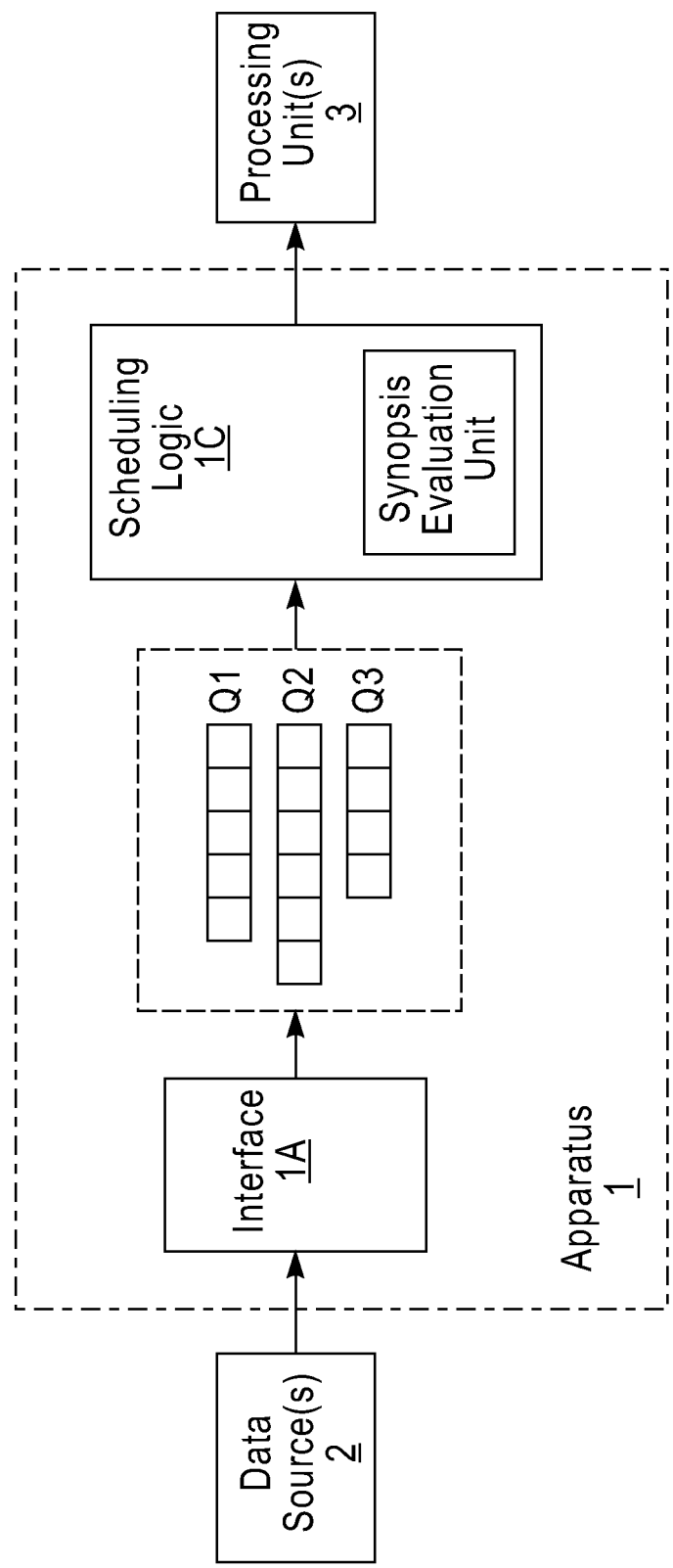
FIG. 1 is a block diagram of a possible embodiment of an apparatus for scheduling event streams according to the present invention.

According an aspect of the present invention there is provided an apparatus for scheduling event streams including an interface for receiving event streams and placing such event streams in corresponding event stream queues and a scheduling logic for selecting at least one event stream amongst the received event streams for dispatch depending on sketched content information data of the received event streams.

In an embodiment of the apparatus according to the present invention, the sketched content information data of an event stream is a determined synopsis of at least one aspect of the event stream, the synopsis including one or more of an average value, a degree of skew, a degree of deviation, an occurrence frequency and a degree of information entropy.

In an embodiment of the apparatus according to the present invention, the interface is designed for receiving event streams of different types. For each type of event stream a corresponding event stream queue is provided.

In an embodiment of the apparatus according to the present invention, each event stream includes a sequence of event stream data, each including a single number or a set of numbers, a single character or a set of characters.

In a further embodiment of apparatus according to the present invention, a pre-processing unit is provided for pre-processing the received event streams, each having specification data specifying the type of the respective event stream used to determine the type of the respective event stream.

In an embodiment of the apparatus according to the present invention, the scheduling logic includes a synopsis evaluation unit for comparing a determined synopsis of an event stream with at least one recorded synopsis assigned to the respective event stream, preferably assigned to the respective type of event stream, wherein the synopsis evaluation unit is designed for selecting the event stream for dispatch whose comparison result matches a configurable selection criterion.

Another aspect of the present invention provides a server for a network including a scheduler for scheduling event streams received via an interface from a network, the scheduler including a sketching engine for sketching the received event streams to determine content information data about the content of the received event streams, and a selection engine for selecting at least one received event stream amongst the received event streams for dispatch depending on the determined content information data of the received event streams. Another aspect of the present invention provides for a network including at least one such server for scheduling event streams received via an interface from the network, the network further including at least one data source for generating one or several event streams.

Another aspect of the present invention provides for a method for scheduling event streams including the steps of determining content information data about the content of event streams by sketching; and selecting at least one event stream amongst the received event streams for dispatch depending on the determined content information data of the event streams.

In an embodiment of the method according to the present invention the sketched content information data of an event stream is a calculated synopsis of at least one aspect of the event stream, the synopsis including one or more of an average value, a degree of skew, a degree of deviation, an occurrence frequency and a degree of information entropy.

In an embodiment of the method according to the present invention, the following steps are performed: determining multiple synopses as content information data of each event stream over different times scales; comparing a determined synopsis of an event stream with the recorded synopsis assigned to the respective event stream, preferably assigned to the respective type of event stream, and selecting the event streams for dispatch whose comparison result matches a configurable selection criterion.

In a further embodiment of the method according to the present invention, the multiple event streams of different types are received via an interface.

In an embodiment of the method according to the present invention, a received event stream is pre-processed for determining the type of the received event stream. The received event stream is placed in a corresponding event stream queue provided for event streams of such type.

In an embodiment of the method according to the present invention, the dispatched event stream is forwarded to a processing unit for further processing or the dispatched event stream is removed.

In an embodiment of the method according to the present invention, the events from event streams are shed such that the number of events dropped from an event stream is inversely proportional to its information content indicated by the determined content information data of the event streams.

In an embodiment of the method according to the present invention, the maximum capacity of an event stream queue is adjusted respectively to the determined content information data of the corresponding event streams.

In an embodiment of the method according to the present invention, event streams arriving at an event stream queue at full capacity are dropped.

In an embodiment of the method according to the present invention, the determined synopses of the received event streams are monitored, and an action is triggered if at least one determined synopsis of an event stream matches a configurable alert criterion.

Another aspect of the present invention provides for a computer program including instructions for performing any of the above methods for scheduling event streams the method including the steps. Further, a data carrier for storing such a computer program may be provided according to another aspect of the present invention.

In the following, embodiments of the apparatus and method for scheduling event streams are described in detail with reference to the figures.

As can be seen from FIG. 1, an apparatus 1 for scheduling event streams includes in a possible embodiment an interface 1A for directly or indirectly receiving event streams from one or more data sources 2. The event streams can be transmitted from the data sources 2 directly via a wireless or wired communication data line to the interface 1A or via one or more networks. The apparatus 1 further includes in a possible embodiment a memory unit 1B for storing event streams in queues Q. The apparatus 1 further includes a scheduling logic 1C which selects at least one event stream amongst the received event streams for dispatch depending on sketched content information data of the received event streams.

The dispatched event streams can be forwarded to one or more processing units 3. The interface 1A places or sorts the received event streams in corresponding event stream queues Q, for example in queues Q1, Q2, Q3 as shown in the example of FIG. 1. The event stream queues Q1, Q2, Q3 can have the same or different lengths as indicated in FIG. 1. The scheduling logic 1C selects at least one event stream amongst the received event streams placed in the queues Q for dispatch depending on sketched content information data of the received event streams.

In a further embodiment, the sketched content information data of an event stream is a determined synopsis forming a summary of at least one aspect of the respective event stream. This synopsis can include for example one or more of an average value, a degree of skew, a degree of deviation, an occurrence frequency and a degree of information entropy of the respective event stream. Preferably, the synopsis may include all of an average value, a degree of skew, a degree of deviation, an occurrence frequency and a degree of information entropy of the respective event stream.

The interface 1A can receive one or multiple event streams of the same or different types. The event streams can have different data formats and can be received continuously or within data packets. In a further embodiment, for each type of event stream a corresponding event stream queue Q is provided within the memory 1B. Each event stream received by the interface 1A includes a sequence of event stream data. This event stream data can include a single number or a set of numbers. In a further embodiment, the event stream data can include single characters or a set of characters. Further, it is possible that the event stream data includes a mix of numbers and characters. The event stream data can also be signal data.

In a possible embodiment, the interface 1A includes a pre-processing unit which is provided for pre-processing the received event streams. In a possible embodiment, the event streams each have specification data specifying the type of the respective event stream used to determine the type of the respective event stream. In a possible embodiment the type specification data form part of a header within a data packet. The received event stream data can be event stream data of any type such as sensor data or stock value data. The different types of event streams are placed into different queues Q which can be formed in a possible embodiment by FIFO queues. The queues can be managed dynamically within a memory or in an alternative embodiment they can be hardwired. The interface or IO unit reads the stream of bytes received from the network and places the events into the appropriate queue Q according to its respective type. In a possible embodiment, each event type has its own FIFO queue.

In a possible embodiment, apparatus 1 includes a scheduling logic 1A having a synopsis evaluation unit which compares a current synopsis of an event stream with at least one recorded synopsis assigned to the respective event stream, preferably assigned to the respective type of event stream. In a possible embodiment, the synopsis evaluation unit selects the event stream for dispatch whose comparison result matches a configurable selection criterion. In a possible embodiment, a dispatched event stream is forwarded to a processing unit 3 for further processing. In an alternative embodiment, the dispatched event stream is removed or shed. In a possible embodiment, events from event streams are shed such that the number of events dropped from an event stream is inversely proportional to its information content as indicated by the determined content information data of the event streams.

In a possible embodiment, the maximum capacity of the event stream queue is adjusted respectively to the determined content information data of the corresponding event streams. In a possible embodiment, event streams arriving at an event stream queue at full capacity can be dropped. The determined synopsis of the received event streams can be monitored, and an action can be triggered if at least one of the determined synopsis' of an event stream matches a configurable alert criterion. The apparatus 1 as shown in FIG. 1 can be provided within a server of a data network. This data network can include one or several servers, each including an apparatus 1 as shown in FIG. 1, a plurality of data sources 2 and a plurality of processing units 3. In an alternative embodiment, the data source 2 of apparatus 1 and the processing unit 3 are integrated in the same unit.

Figure 2:
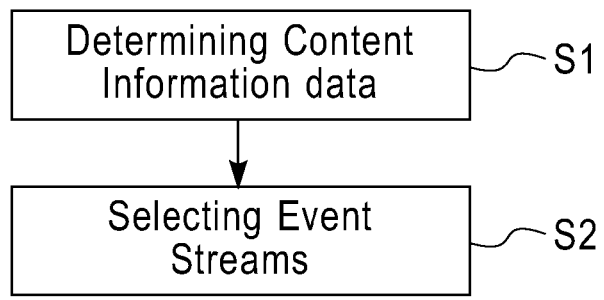
FIG. 2 is a flowchart of a possible embodiment of a method for scheduling event streams according to the present invention.

FIG. 2 is a flowchart of a possible embodiment of a method for scheduling event streams according to the present invention.

In a first step S1, the content information data which indicates the information content of an event stream, is determined by sketching for each event stream.

In a further step S2, at least one event stream amongst the received event streams is selected for dispatch depending on the determined sketched content information data of the event streams.

The sketched content information data of an event stream is a calculated synopsis of the respective event stream. This synopsis forms a summary of at least one aspect of the respective event stream. For example, the synopsis can include an average value, a degree of skew, a degree of deviation, an occurrence frequency or a degree of information entropy of the received event stream. In a possible embodiment of the method according to the present invention, multiple synopses as content information data for each event stream are determined over different time scales. In a possible embodiment, the current synopsis of each event stream is compared with the determined synopsis of the respective event stream. Then, the event stream is selected for dispatch whose comparison result matches a configurable selection criterion.

The method according to the present invention uses sketching techniques to describe the contents of the event stored temporarily in the queues and keeps multiple sketches calculated across different time scales for each queue. The scheduling logic 1C makes use of this content information in order to select the likely most interesting queue. In a possible embodiment, the scheduling logic 1C compares the current entropy of all the queues Q with the entropy over a longer time scale and schedules the queue Q having the greatest divergence first. This divergence between what is currently stored in the queue with the data which has been observed in the past allows the scheduling logic 1C to have a measure of how surprising the current available unread messages or event stream is. This can be directly taken in to account by the scheduling logic 1C. For example, the scheduling logic 1C can select or schedule the most surprising queue first or can determine in conjunction with other means such as priorities which non-empty queue should be serviced next for the following processing. Other schemes can be used by the scheduling logic 1C as well, for example scheduling the queue having the highest current entropy first.

In the apparatus according to the present invention, the concept of FIFO queues is extended to contain a sketch of the data currently contained in the respective queue. In a possible embodiment, the sketched queues are lock-free meaning that a reader and a writer can simultaneously add and remove a data element without synchronization. Possible content information data of an event stream is the entropy of the received event stream. Other objective measures are also possible, for example frequency norms or higher order entropy.

In a possible embodiment, the sketched data can be updated by the IO system or the interface 1A that places the sketches or calculated sketch data in the respective queue and the scheduling logic 1C later removes the sketched data after dispatch of the event stream.

In a possible embodiment, the IO system does format the event data. For example, the interface 1A reads the header and allocates appropriate amounts of memory space. Further, the interface 1A can in a possible embodiment update the sketch information data. In a possible embodiment, once the scheduling logic 1C removes an event from the event stream queue the sketched data is updated to account for the removal of this event from the queue. In an embodiment, the sketched queue can be simultaneously be updated by both the IO system 1A and the scheduling logic 1C. In a possible embodiment, the scheduling logic 1C can maintain a history of the event stream entropy measured since the system has started while the IO system measures the current entropy of the unprocessed events in the queue Q. This can be achieved using an algorithm with a sliding window whose length is a current window length. In a possible embodiment, the entropy of the unprocessed events can be measured for each new arrival of an event. In an alternative embodiment, the entropy of the unprocessed events can be measured periodically. In a further embodiment, the entropy of the unprocessed events can be calculated after a certain amount of new event stream data elements has been added. In a possible embodiment, the apparatus 1 operates and processes the event streams in real time.

The apparatus 1 according to the present invention preferably is adapted to process applications wherein the contents of event streams are sketched and the resulting synopses are made available to the scheduling logic 1C that determines the order of tasks and the shedding of data load. The behavior of the apparatus 1 basically depends on two algorithms, i.e. the algorithm used for sketching the event stream and the algorithm used to select an event stream amongst the received events. In a possible embodiment, both algorithms are configurable by the respective application. In a possible embodiment, the scheduling logic 1C is configured to maximize an information rate on the basis of the empirical Shannon entropy of the received event streams.

The Shannon entropy of a data stream (measured in bits) is given by.

$$H(x) = \sum_{i=1}^{n} p(x_i) \log_2 p(x_i)$$

where $x_i=1,\ldots,n$ are all the possible values contained in the event stream and $p(x_i)$ is the probability of their occurrence.

The entropy is an objective measure of the information content of the event data stream. The entropy of different event streams is unknown a priori and can vary over time. In a possible embodiment, the Shannon entropy is calculated by the apparatus. A maximum entropy is obtained when all values have an equal possibility of occurring. For example, a randomly generated data stream has maximum entropy as information about the future behaviour cannot be derived from the past behaviour. In particular, the value $-\log_2 p(x_i)$ within the above equation is called surprisal value as it measures how surprised one is about the occurrence of a given event. If $p(x_i)$ tends to zero, the surprisal value will tend slowly to infinity. In a real time monitoring system, a high variance event stream is typically of more importance than event streams which are steady. Moreover, event streams whose current behavior differs from their past behaviour are of special interest. Therefore, in a possible embodiment the information entropy of the received event streams may be used to select the event streams whose events are to be processed next. To calculate the entropy and surprisal value, one needs to know the probability distribution for the event stream. Since a probability distribution is not always known up-front, the probability distribution is inferred in a possible embodiment from historic data. In a possible embodiment, a counter is maintained for each event and incremented after arrival of the corresponding event. The probability of an event occurrence can then be inferred from the value of this counter divided by the total number of arrived events. This embodiment requires to keep a per stream state proportional to the product of the size of the maximum number of occurrences of an event and the number of possible events. Since for most real data streams this can be impractical in a preferred embodiment sketching by way of a sketching algorithm is used as a means for obtaining information about the content of an event stream while only a limited amount of memory space is used.

Probabilistic algorithms which allow a bound to be given on the probability and extent of deviation from the true answer are said to guarantee a $(\epsilon,\delta)$-approximation where $\epsilon$ is the degree of deviation and .delta. is the probability of deviation. If Q is the actual number and $\hat{Q}$ is the estimate produced by the algorithm one can write $|\hat{Q}-Q|<\epsilon Q$ with probability at least $(1-\delta)$.

For creating such a synopsis algorithms are used that provide an $(\epsilon,\delta)$-approximation while having a memory complexity that grows poly-logarithmically with the number of values in the event stream.

Chakabrabarti et al (in Soda 07 Proceedings of the eighteenth annual ACM-SIAM Symposium of Discrete algorithm page 328-335, Philadelphia 2007) describe a general approach to estimate the empirically entropy of a stream. This approach defines a random variable whose expected value is the synopsis and whose variance can be bounded.

A random variable X and is defined to assure that its expected value is the empirical entropy of the stream of length m. A random variable R can be generated by randomly and uniformly picking an index q in the stream, reading the value k at that index, and counting all appearances of k beyond q. X then amounts to:

$$X = (f(R-1) - f(R))$$

where $$f(m_k) = m_k \left(\frac{m}{m_k}\right)$$

and $$f(0) = 0.$$

In order to show that the expected value of X is the empirical entropy of the stream it can be assumed that some value of R results from a randomly chosen index whose value in the stream is k. It is equally probable that R will have the value of $1, 2, \ldots$, up to $m_k$, where $m_k$ is the number of occurrences of k. Therefore, it is also equally likely that X will have any of its possible values $f(R-1)-f(R)$. The probability of each of these values of X occurring is $1/m_k$. Thus, the expected value of X, when k is fixed, is:

$$(f(1)+(f(2)-f(1)++(f(m_k)-f(m_k-1))/m_k=f(m_k)/m_k$$

The chance of selecting a value k is $m_k/m$ (the number of occurrences of k divided by the stream length). Suppose there are n distinct values in the stream. The expected value of X is the sum of expected values for fixed k, thus E(X):

$$\frac{1}{m}k = 1\sum_{}^{n} f(m_k) = (p)$$

i.e. the empirical entropy of the event stream.

The next step is to derive the bounds on variance. Because the entropy estimate is calculated as an average of several independent and identically distributed random variables $X_i$, it can be shown that not many of them deviate from their expected value. The probability of each $X_i$ deviating from its expected value is given by the Chebyshev inequality. The probability that the mean of a collection of $I_i$ does not deviate from its expected value can be bounded by the Chernoff inequality.

Analysis shows that the number of samples c required to achieve a given $(\epsilon,\delta)$-approximation is inversely proportional to the expected value of the entropy. If the expected entropy is low, the number of samples taken must increase. However, one does not know the expected value of the entropy before running an estimator. Moreover, as the entropy tends to zero, the number of samples becomes unbounded. A possible approach is to distinguish between event streams that have one element that occurs more than half the time and those that don't. The bound is set such that the entropy of a stream without such a predominate element can be accurately measured. By keeping track of the most frequently occurring data element one can determine if the entropy of the event stream is too low to be accurately measured with the required number of samples. If so, the entropy of the event stream is measured without the most frequently occurring data element and then the estimate is adjusted to account for this.

Chakabrabarti et al propose using the Misa-Gries algorithm to identify the most frequently occurring element. Misa-Gries is a deterministic algorithm that keeps track of a small number of counters. Every time a value is read in the event stream that corresponds to an already counted value, that counter is incremented by one, otherwise if less than the maximum number of counters are in use then a new counter is added for the value. If the value is not in the set of counters and all the counters are being used than all the counters are decremented. If a counter reaches zero it is replaced by the next value found in the event stream that is not already in the counter set. This highest value in the counter set is the most frequently occurring elements and the estimate $\hat{m}_1$ of the actual number of occurrences $m_i$ is bounded for k counters by the following:

$$\hat{m}_i \leq m_i \text{ AND } m_i - \hat{m}_i \leq \frac{m - m_i}{k}$$

The Misa-Gries algorithm detects the most frequently occurring element if the number of occurrences is greater than the error bound. If this is not the case then the result of the algorithm is arbitrary.

Figure 3:
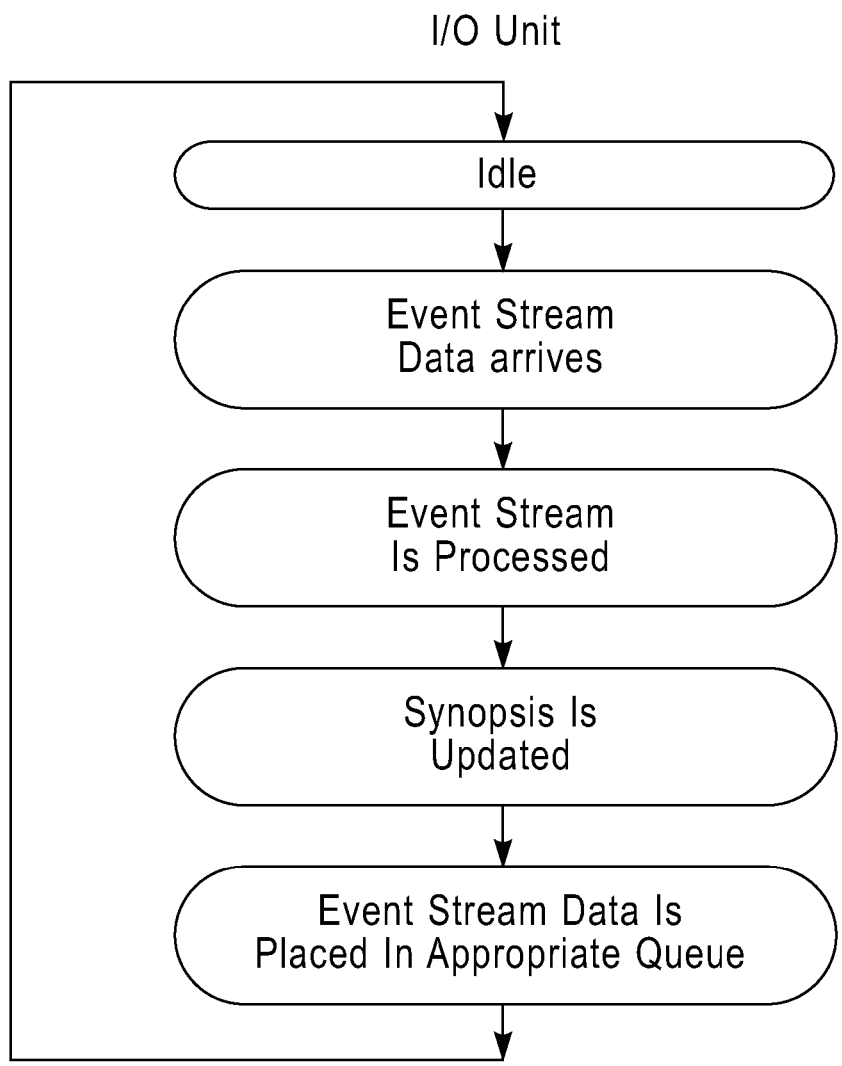
FIG. 3 is a state diagram of an IO unit within an apparatus according to a possible embodiment of the present invention.

FIG. 3 is a state diagram of an IO unit which can be used within the apparatus 1 according to the present invention as shown in FIG. 1. From an idle state, the IO unit performs an identification or processing of the event streams after their arrival. Then, the respective synopsis of the event stream is updated. After the event stream data is placed in the appropriate queue Q of the memory 1B, the IO unit returns to the idle state.

Figure 4:
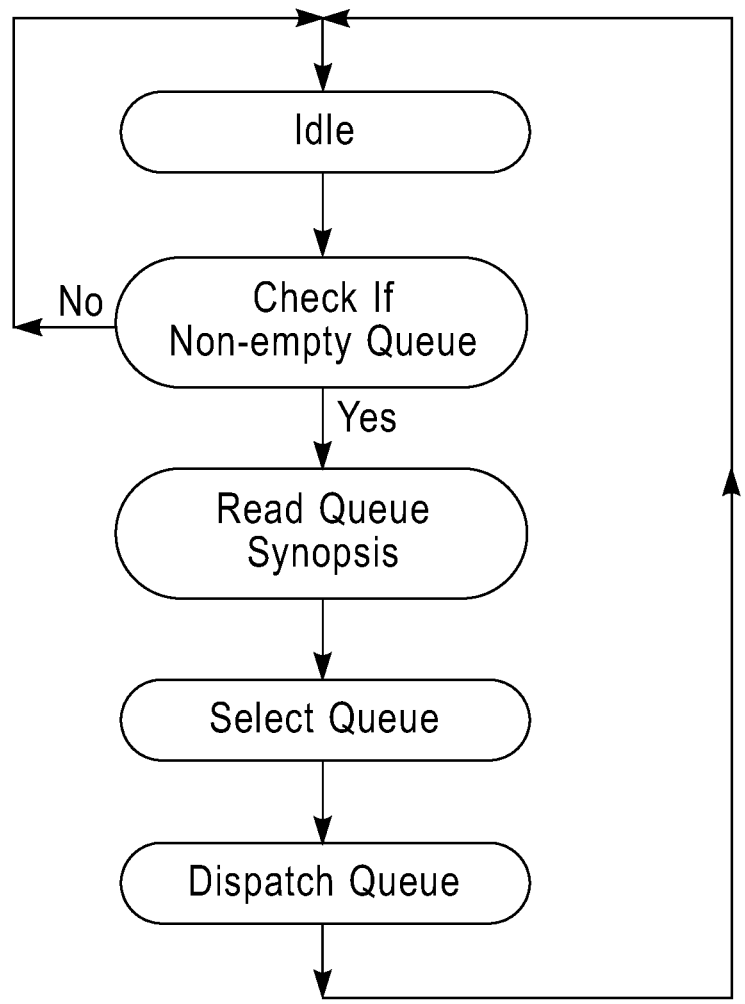
FIG. 4 is a state diagram within a synopsis scheduler in a possible embodiment of the apparatus according to the present invention.

FIG. 4 is a state diagram of a scheduling logic 1C as used in a possible embodiment of the apparatus 1 according to the present invention. If there is at least one non-empty queue in the memory, the scheduling logic 1C reads the queue synopsis of the respective event streams and selects the queue Q for further processing or shedding using a corresponding scheduling algorithm. After the selected queue has been dispatched, the synopsis scheduler 1C returns to the idle state.

The present invention has been described with reference to preferred embodiments thereof. However, those skilled in the art will recognize that the above and various other changes in form and details may be made without departing from the spirit and scope of the invention as set forth in the following claims.

What is claimed is:

1. A method for scheduling event streams, the method comprising:
   receiving event streams, an event stream comprising a sequence of event stream data, each event stream data including numbers, characters or both numbers and characters;
   placing the received event streams in one or more queues;
   determining a degree of information entropy of said received event streams, said information entropy determining comprising:
      sampling a number of event stream data in the corresponding event stream; and
      calculating a degree of the deviation of the samples, wherein a required number of the samples to calculate the degree of deviation is inversely proportional to an expected value of the information entropy of the corresponding event stream;
   determining content information data of the received event streams based on said degree of information entropy of the received event streams;
   selecting at least one event stream, among the received event streams, based on the determined content information data; and
   dispatching the selected event stream,
   wherein a processor coupled to a memory device is configured to perform the receiving, the placing, the information entropy determining, the content information determining, the selecting and the dispatching.

2. The method according claim 1, wherein the degree of information entropy of the received event streams are calculated by performing:
   generating a random variable X whose expected value is the degree of the information entropy of a corresponding event stream which includes m number of event stream data;
   randomly selecting an index q in the corresponding event stream;
   reading a value k at the index q of the corresponding event stream;
   counting all appearance of the value k beyond the index q in the corresponding event stream,
   wherein the random variable X is generated by $X=f(R-1)-f(R)$, where $f(m_k)=m_k(m/m_k)$ and $f(0)=0$, R being a random number and having a value between 1 and $m_k$, $m_k$ being a number of the appearances of k beyond the index q in the corresponding event stream.

3. The method according to claim 1, wherein the content information data of the received event streams are determined based on one or more of:
   an average value of a corresponding event stream, a degree of skew of the corresponding event stream, a degree of deviation from the average value in the corresponding event stream, an occurrence frequency of each number or each character in the corresponding event stream.

4. The method according to claim 3, wherein the selecting comprises:
   comparing the determined content information data of each of the received event streams against a pre-recorded content information data assigned to each of the received event streams; and
   choosing an event stream whose comparison result matches a selection criterion.

5. The method according to claim 1, wherein the placing comprises:
   determining a type of the received event streams;
   assigning each of the received event streams to the one or more queues according the determine type of the each received event stream.

6. The method according to claim 5, wherein the type of the received event streams comprises one of:
   sensor data; or
   stock value data.

7. The method according to claim 2, wherein the selecting comprises:
   calculating information entropy of each of the one or more queues;
   determining a queue, among the one or more queues, whose calculated information entropy is a highest; and
   choosing an event stream in the determined queue for a dispatch.

8. The method according to claim 7, further comprising:
   removing an event stream data from the chosen event stream;
   updating the determined content information data of the chosen event stream after the removal of the event stream data.

9. The method according to claim 2, wherein a chance of reading the value k at the index q is $$\frac{m_k}{m}.$$

10. The method according to claim 2, wherein the counting comprises:
    determining a most frequently appearing value in the corresponding event stream.

11. A system for scheduling event streams, the system comprising:
    a memory device;
    a processor coupled to the memory device,
    wherein the processor is configured to perform:
       receiving event streams, an event stream comprising a sequence of event stream data, each event stream data including numbers, characters or both numbers and characters;

placing the received event streams in one or more queues;
determining a degree of information entropy of said received event streams, said information entropy determining comprising:
sampling a number of event stream data in the corresponding event stream; and
calculating a degree of the deviation of the samples, wherein a required number of the samples to calculate the degree of deviation is inversely proportional to an expected value of the information entropy of the corresponding event stream;
determining content information data of the received event streams based on said degree of information entropy of the received event streams;
selecting at least one event stream, among the received event streams, based on the determined content information data; and
dispatching the selected event stream.

12. The system according claim 11, wherein in order to calculate the degree of information entropy of the received event streams, the processor is further configured to perform:
generating a random variable X whose expected value is the degree of the information entropy of a corresponding event stream which includes m number of event stream data;
randomly selecting an index q in the corresponding event stream;
reading a value k at the index q of the corresponding event stream;
counting all appearance of the value k beyond the index q in the corresponding event stream,
wherein the random variable X is generated by $X=f(R-1)-f(R)$, where $f(m_k)=m_k(m/m_k)$ and $f(0)=0$, R being a random number and having a value between 1 and $m_k$, $m_k$ being a number of the appearances of k beyond the index q in the corresponding event stream.

13. The system according to claim 11, wherein the content information data of the received event streams are determined based on one or more of:
an average value of a corresponding event stream, a degree of skew of the corresponding event stream, a degree of deviation from the average value in the corresponding event stream, an occurrence frequency of each number or each character in the corresponding event stream.

14. The system according to claim 13, wherein in order to perform the selecting, the processor is further configured to perform:
comparing the determined content information data of each of the received event streams against a pre-recorded content information data assigned to each of the received event streams; and
choosing an event stream whose comparison result matches a selection criterion.

15. The system according to claim 11, wherein in order to perform the placing, the processor is configured to perform:
determining a type of the received event streams;
assigning each of the received event streams to the one or more queues according the determine type of the each received event stream.

16. The system according to claim 15, wherein the type of the received event streams comprises one of:
sensor data; or
stock value data.

17. The system according to claim 12, wherein in order to perform the selecting, the processor is configured to perform:
calculating information entropy of each of the one or more queues;
determining a queue, among the one or more queues, whose calculated information entropy is a highest; and
choosing an event stream in the determined queue for a dispatch.

18. The system according to claim 17, wherein the processor is further configured to perform:
removing an event stream data from the chosen event stream;
updating the determined content information data of the chosen event stream after the removal of the event stream data.

19. The system according to claim 12, wherein a chance of reading the value k at the index q is $$\frac{m_k}{m}.$$

20. A computer program product for scheduling event streams, the computer program product comprising a non-transitory storage medium readable by a processor and storing instructions run by said processor for performing a method, said method steps comprising:
receiving event streams, an event stream comprising a sequence of event stream data, each event stream data including numbers, characters or both numbers and characters;
placing the received event streams in one or more queues;
determining a degree of information entropy of said received event streams, said information entropy determining comprising:
sampling a number of event stream data in the corresponding event stream; and
calculating a degree of the deviation of the samples, wherein a required number of the samples to calculate the degree of deviation is inversely proportional to an expected value of the information entropy of the corresponding event stream;
determining content information data of the received event streams based on said degree of information entropy of the received event streams;
selecting at least one event stream, among the received event streams, based on the determined content information data; and
dispatching the selected event stream.

21. The computer program product according claim 20, wherein the degree of information entropy of the received event streams are calculated by performing:
generating a random variable X whose expected value is the degree of the information entropy of a corresponding event stream which includes m number of event stream data;
randomly selecting an index q in the corresponding event stream;
reading a value k at the index q of the corresponding event stream;
counting all appearance of the value k beyond the index q in the corresponding event stream,
wherein the random variable X is generated by $X=f(R-1)-f(R)$, where $f(m_k)=m_k(m/m_k)$ and $f(0)=0$, R being a random number and having a value between 1 and $m_k$, $m_k$ being a number of the appearances of k beyond the index q in the corresponding event stream.

* * * * *